United States Patent [19]
Seymour et al.

[11] Patent Number: 5,310,235
[45] Date of Patent: May 10, 1994

[54] GOLF CART WEATHERSHIELD

[76] Inventors: Timothy B. Seymour, P.O. Box 12354, Beaumont, Tex. 77726; Jack H. Riley, P.O. Box 947, Beaumont, Tex. 77704

[21] Appl. No.: 925,779

[22] Filed: Aug. 7, 1992

[51] Int. Cl.$^5$ .............................................. B60J 9/00
[52] U.S. Cl. ............................. 296/77.1; 280/DIG. 5
[58] Field of Search ............................. 296/77.1, 102; 280/DIG. 5

[56] References Cited

U.S. PATENT DOCUMENTS

| | | | |
|---|---|---|---|
| 3,709,553 | 1/1973 | Churchill et al. | 296/77.1 X |
| 4,098,536 | 7/1978 | Mills | 296/77.1 |
| 4,773,694 | 9/1988 | Gerber | 296/77.1 |

Primary Examiner—David M. Mitchell
Assistant Examiner—Andrew C. Pike

[57] ABSTRACT

A weatherproof flexible enclosure with 360 degree visability constructed to completely surround the roof and sides of most gasoline or electric powered golf carts for protection during inclement weather. The surround, top and rear panels are sewn together on top and front of the surround with an elastic sewn and stretched across the rear for flexibility in fitting both large and small golf carts. A top and rear sheet covering the golf club area is attached by the hook and loop system at two select intervals on each side to the rear of the front surround sheet on both sides, securing passengers, golf cart, clubs and bag from inclement weather. When removed from the cart, the enclosure may be folded and stored in a standard size golf bag.

9 Claims, 3 Drawing Sheets

FIGURE I
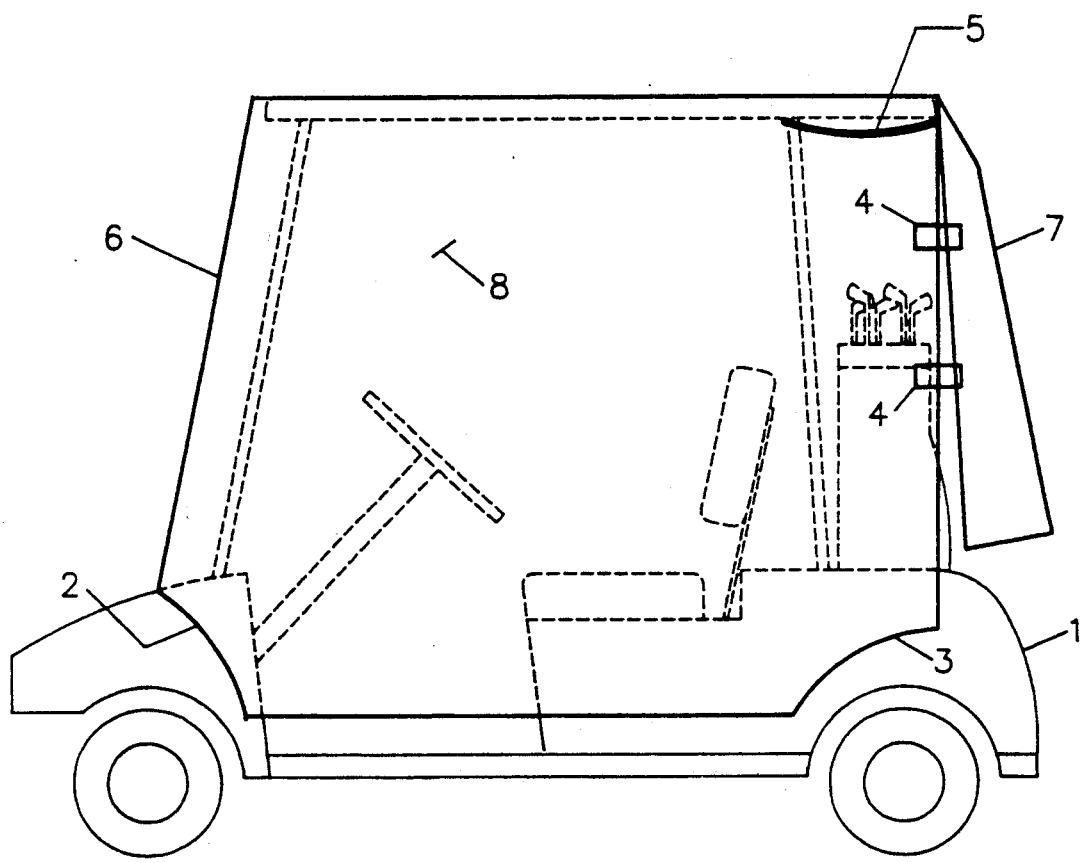

FIGURE II
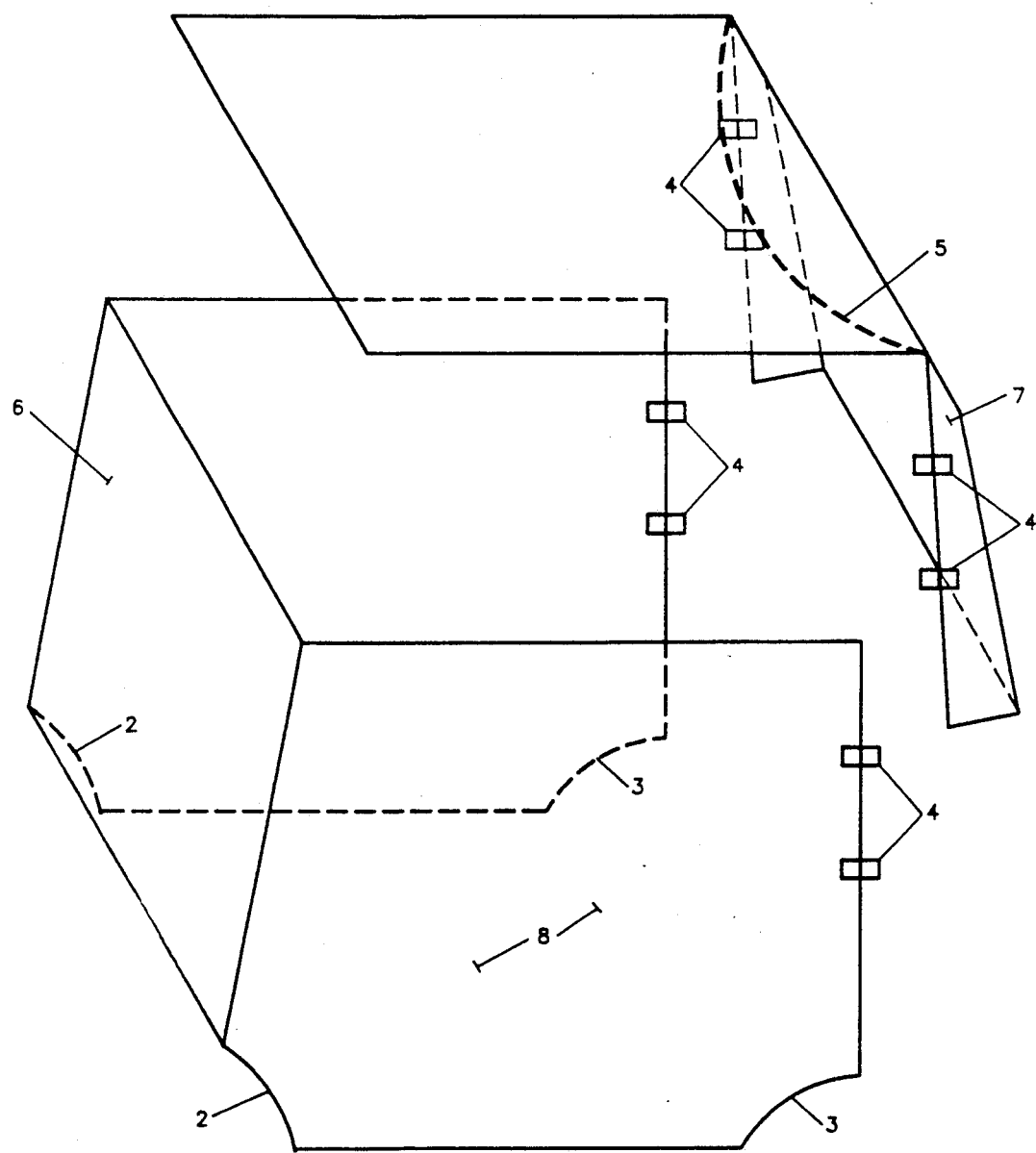

FIGURE III
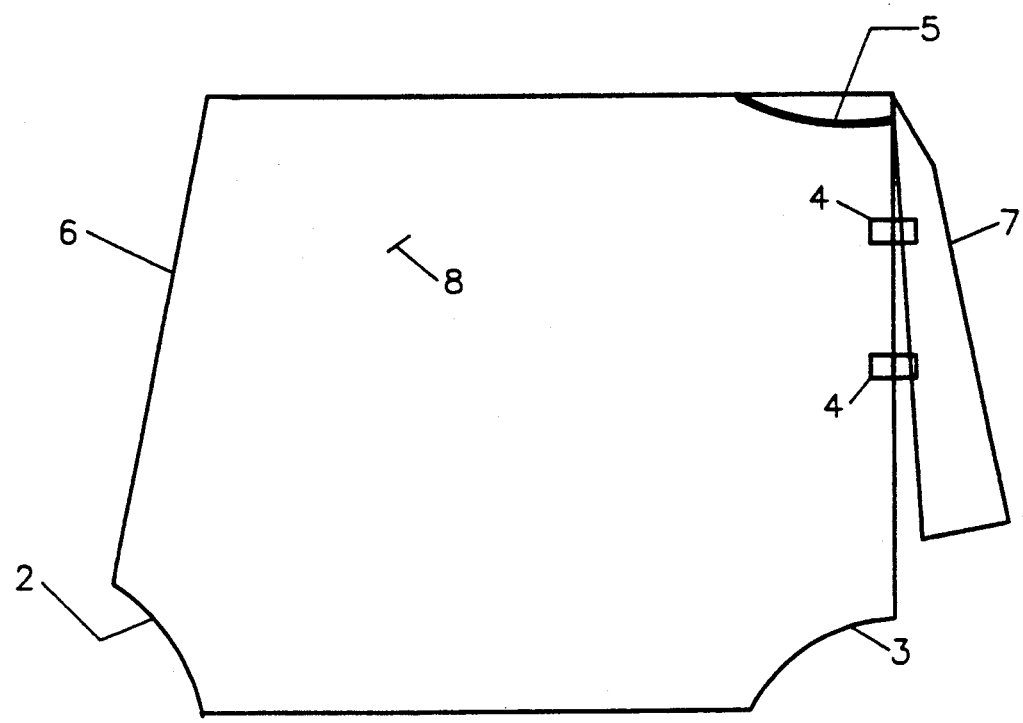
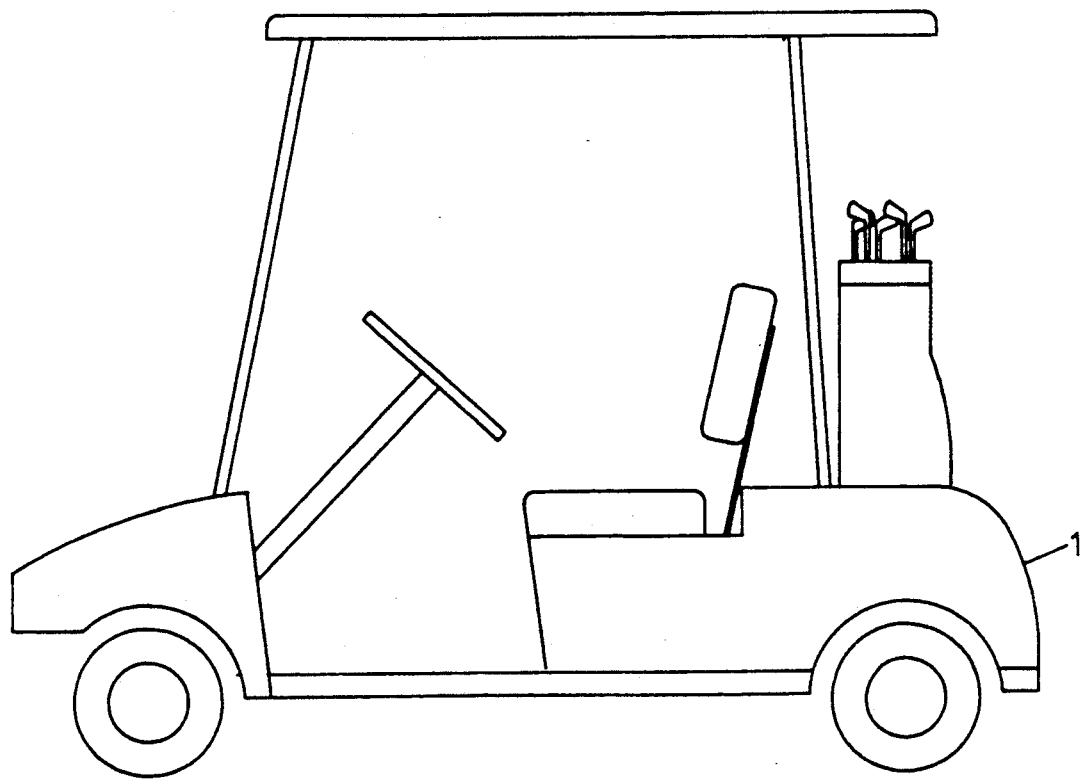

GOLF CART WEATHERSHIELD

BACKGROUND OF THE INVENTION

1. FIELD OF THE INVENTION

This invention is related to a transparent enclosure with a 360 degree visability of most standard size electric or gasoline powered golf carts to shield one of more passengers of a golf cart vehicle from inclement weather, including cold, wind and/or rain.

2. DESCRIPTION OF THE PRIOR ART

There are other golf cart enclosures designed to shield golf cart passengers and club area from inclement weather. They are comprised of transparent, flexible panels or sheets with a various amount of openings that affix to the roof of the golf cart. The panels are secured with zippers or fastners and sometimes are even permanent fixtures to a particular golf cart. For example, U.S. Pat. No. 3,709,533, Churchill, et, al, discloses a golf cart enclosure which is comprised of a slidable rain curtain along a channel mechanism which is permanently attached to the roof of the golf cart. U.S. Pat. No. 4,773,694, discloses the golf cart enclosure must be permenently mounted to a specific golf cart by snaps or fastners. Mills, et, al, U.S. Pat. No. 4,098,536, is most like this invention, but has a zipper opening, has two transparent windows for frontal vision only, and the enclosure must be stored in a separate specific pouch.

SUMMARY OF INVENTION

The primary object of this invention is to provide a completely removable, collapsible weather-shield which can be easily and quickly placed to cover most golf carts and easily removed, folded and stored in the golfer's club bag.

This invention can overcome some of these disadvantages because it has a 360 degree visability safety feature in that the entire enclosure in translucent, the weather-shield can easily and quickly be placed on most standard size electric or gasoline powered golf carts having a canopy or roof. This invention also has no metal parts to rust or corrode due to high humidity levels during inclement weather. The weather-shield is constructed to completely surround all sides of a golf cart. It protects the passengers and golf clubs from inclement weather with good visability for guiding the golf cart. It is flexible enough to be easily folded and stored in the golfer's club bag. This feature makes the weather-shield readily assecible on the golf course should there be a chance of inclement weather during a golf game. When properly maintained, by making certain the weather-shield is dry before storing for any period of time, the weather-shield is mildew resistant.

The purpose of summarizing this invention, the invention comprises a golf cart weather enclosure with 360 degree visability which has quick and easy installation on standard sized electric or gas powered golf carts to protect the golf cart passengers from cold, wind and/or rain. The translucent material enables the golfer/driver a 360 degree visability of his surroundings as an excellent safety feature when being transported in the golf cart on the golf course or other areas as necessary. The complete surround of the enclosure to the golf cart and club areas enables the golfers and/or passengers, and golfing clubs to be completely shielded from inclement weather. Small fastners on the sides to the back panel enables the golfers to ingress and egress easily to and from the cart.

The novel feature of this invention is that the enclosure is made of such a quality grade of translucent material as to the protection from cold, wind, and/or rain, and the visability of the passengers. This lightweight material makes it easy to fold and store in the golfer's bag for ready accessibility on the golf course as not to be completely interrupted during a golf game. Having the weather-shield on hand at all times in the golf bag enables the golfer to be prepared when inclement weather occurs regardless of location. There are no specific instructions needed to install the weather-shield. It is constructed to fit most standard sized golf carts by stretching the band of elastic, which is sewn into the enclosure, to fit beneath the enclosure across the rear roof of the golf cart. There are two fastners on the sides to the rear panel of the enclosure for extra protection from inclement weather. Further information of this invention follows in the drawings.

BRIEF DESCRIPTION OF THE DRAWINGS

Advantages of this invention will become clear as the following detailed description is studied with the accompanying drawings.

FIG. I. A view of a golf cart with the weather-shield of the present invention in place over the golf cart.

FIG. II. An illustration as to the surround, top and back of the enclosure as it fits together before being sewn showing the wheel cutouts and the placement of the hook and loop system as well as the placement of the elastic.

FIG. III. A view illustrating the weather-shield as it is being placed into position over the golf cart.

DETAILED DESCRIPTION OF THE PREFERRED EMBODIMENT

The discussion begins with FIG. I; the weather-shield 8 according to the present invention is illustrated as it would look on a standard gas or electric powered golf cart 1. As shown, the weather-shield 8 is placed over the golf cart 1 supported by a canopy and completely surrounds the golf cart 1. The front of the weather-shield 8 fits over the front of the cart with cutouts for the front 2 and rear 3 wheels located on both sides. The lower edges are positioned as to not be disturbed or blown off in windy conditions. FIG. I also indicates the placement of a one half inch elastic 5 sewn in the top panel 9.5 inches from the rear corners on both sides which is loosely stretched from one side of the top panel to the other and is double supported with elastic. This secures the cover to the cart enabling the weather-shield to fit small and large styled golf carts. In FIG. I, the placement of fastners 4 are shown in the rear area of the weather-shield 8. The dimensions of the completed weather-shield 8 are 54 inches tall by 60 inches long with a 40 inch rear panel and 42 inch wide front panel with the wheel cover cutouts for easy wheel access. The rear area of the enclosure 7 drapes over the golf clubs and bag, securing them from inclement weather.

In FIG. II, the weather-shield 8 is shown in two separate sheets of translucent 16 gauge clear buff vinyl, one being the surround 6 and the other, the top and rear 7. The two sheets are sewn together at the top using NYMO size "E" thread for durability. NYMO is a trademark of a commercially available thread. The top and rear 7 sheet is folded and sewn so as to make rear corners on both sides at the rear of the enclosure 8.

When sewn to make the corners, a one-half inch elastic 94 inches long 5, is sewn in on both sides as it is loosely stretched across the rear of the golf cart 1. This elastic enables the enclosure to fit both large and small golf carts. Indicated on the top and rear sheet 7, is the placement of a 2 inch by 2 inch square hook material 4 and a 2 inch by 6 inch hook material 4. FIG. II also shows the placement of both a 2 inch by 2 inch square loop material 4 and a 2 inch by 6 inch loop material 4 on the surround sheet 6. This material is sewn in and is a part of the hook and loop fastening system whereby one strip has minute loops and the mating strip has hooks on the surface. When the two strips 4 are mated, a fastening device is securing the weather-shield 8 to the side and back of the enclosure securing the golf cart from inclement weather.

FIG. II also illustrates the wheel cutouts for the front 2 and rear 3 wheels on both sides of the translucent material for easy wheel access.

FIG. III illustrates the entire weather-shield and its placement over the golf cart 1. As mentioned in FIG. I, the weather-shield 8 is placed over the golf cart 1 supported by a canopy and completely surrounds the golf cart 1. The lower edges are positioned as to not be disturbed or blown off in windy conditions. FIG. III also illustrates the 360 degree visability feature for safe maneuvering of the golf cart 1. A driver must be able to adequately see clearly to maneuver the golf cart 1 safely. If the weather appears unpredictable, the weather-shield 8 can be placed over the golf cart 1 and the walls folded upward and placed under the top section of the golf cart 1 until needed. When the weather-shield 8 is not in use, and is to be stored for a period of time, it is removed from the cart, permitted to dry, and then folded for storage in the golfer's club bag. Because of its lightweight flexibility, the materials and design of the weather-shield 8, the enclosures can be easily and compactly folded for storage. Most golf course establishments could rent and/or have this invention on hand for its customers during inclement weather. The expense to the golf course establishments would be less than with permanent shields. Individuals can purchase the weather-shield 8 and keep it as his/her golf bag to have it readily available. During inclement weather, the weather-shield invention being described, can be placed on a golf cart within minutes.

With the invention being described,
What is claimed is:

1. A weather-shield enclosure for a standard size gasoline or electric golf cart for protecting passenger and golf bag areas thereof from inclement weather, the weather-shield enclosure comprising:
   (a) a surround sheet having a front portion and side portions for protecting a front and sides of the golf cart, respectively;
   (b) a top-and-rear sheet having a top portion and a rear portion for protecting a top and a rear of the golf cart, respectively;
   (c) means for permanently interconnecting the sheets to each other;
   (d) means for releasably connecting the sheets together when the sheets are placed over the golf cart, wherein the releasably connecting means comprises hook-and-loop fastners at two predetermined locations on a rear of one of said side portions and at two predetermined locations on a portion of said rear portion adjacent said rear of said one of said side portions releasably connected together, respectively, and hook-and-loop fastners at two predetermined locations on a rear of another of said side portions and at two predetermined locations on a portion of said rear portion adjacent said rear of said other of said side portions releasably connected together, respectively; and
   (e) an elastic sewn into and loosely stretched across the top-and-rear sheet to enable the enclosure to properly fit the golf cart when the sheets are placed over the cart;
   wherein the sheets are translucent, and the weather-shield enclosure is flexible and has 360 degree visability.

2. A weather-shield as described in claim 1, wherein the surround sheet has cut outs for the front and rear wheels on both sides for easy wheel access.

3. A weather-shield as described in claim 1, wherein said means to connect top-and-rear sheet and surround sheet are sewn together with a commercially available thread.

4. A weather-shield as described in claim 3, wherein said elastic is sewn into the top-and-rear and surround sheets at two predetermined locations at the rear of the top-and-rear sheet when these said sheets are sewn together for said elastic to stretch across the top-and rear sheet to enable proper fitting of the enclosure on the golf cart.

5. A weather-shield as described in claim 3, wherein the top-and-rear sheet is folded and sewn so as to make rear corners on both sides at the rear of said enclosure.

6. A weather-shield as described in claim 1, wherein the releasably connecting means of the two said sheets at the rear of the side portion on both sheets, comprises a hook and loop fastening system in which said system is sewn at two predetermined locations to the side rear portions of both said sheets with one side having hooks to connect with the other side having loops for connecting the surround sheet with the top-and-rear sheet to complete the enclosure over the golf cart.

7. A weather-shield as described in claim 1, wherein the top-and-rear sheet of the enclosure extends to protect the club area of the golf cart.

8. A weather-shield for golf carts as described in claim 1, wherein the flexibility of the enclosure enables said weather-shield to be easily and compactly folded for storage in a golfer's bag.

9. A weather-shield enclosure as described in claim 1, has a 360 degree visibility due to its translucent comprisement in its entirety.

* * * * *